(12) United States Patent
Reber (10) Patent No.: US 10,168,203 B2
(45) Date of Patent: Jan. 1, 2019

(54) BALANCE WITH FREE-FLOATING WEIGHING PAN

(71) Applicant: Mettler-Toledo GmbH, Greifensee (CH)

(72) Inventor: Daniel Reber, Madetswil (CH)

(73) Assignee: Mettler-Toledo GmbH, Greifensee (CH)

( * ) Notice: Subject to any disclaimer, the term of this patent is extended or adjusted under 35 U.S.C. 154(b) by 173 days.

(21) Appl. No.: 15/431,072

(22) Filed: Feb. 13, 2017

(65) Prior Publication Data

US 2017/0153140 A1    Jun. 1, 2017

Related U.S. Application Data

(63) Continuation of application No. PCT/EP2015/068993, filed on Aug. 19, 2015.

(30) Foreign Application Priority Data

Sep. 4, 2014   (EP) .................................... 14183599

(51) Int. Cl.
| | | |
|---|---|---|
| *G01G 7/04* | (2006.01) | |
| *G01G 21/20* | (2006.01) | |
| *G01G 23/01* | (2006.01) | |
| *G01G 21/18* | (2006.01) | |
| *G01G 21/23* | (2006.01) | |
| *G01G 7/02* | (2006.01) | |

(52) U.S. Cl.
CPC ............... *G01G 21/18* (2013.01); *G01G 7/02* (2013.01); *G01G 7/04* (2013.01); *G01G 21/20* (2013.01); *G01G 21/23* (2013.01); *G01G 23/01* (2013.01)

(58) Field of Classification Search
CPC ............ G01G 7/02; G01G 7/04; G01G 21/18; G01G 21/20; G01G 21/23; G01G 23/01
See application file for complete search history.

(56) References Cited

U.S. PATENT DOCUMENTS 5,485,748 A    1/1996 Zeamer

FOREIGN PATENT DOCUMENTS

| FR | 2 657 431 A1 | 7/1991 |
|---|---|---|
| JP | 2005-127858 A | 5/2005 |
| WO | 2016/155869 A1 | 10/2016 |

OTHER PUBLICATIONS

Computer translation of JP 2005-127858 from the JPO website, Sep. 28, 2018.*

\* cited by examiner

*Primary Examiner* — Randy W Gibson (74) *Attorney, Agent, or Firm* — Standley Law Group LLP (57) ABSTRACT

A balance (1) has a weighing pan (3) that is held in a predetermined free-floating and constant position relative to translatory and rotary displacements in the six degrees of freedom during use. At least six position sensors are used to measure the position of the weighing pan in all three dimensions. A weighing mechanism having at least six electromagnetic mechanisms (5) generate compensation forces ($F_{c1}$-$F_{c6}$) that act on the weighing pan by sending currents through a force coil (7) associated with an associated permanent magnet. The weight of an object on the weighing pan is determined from the amounts of current flowing in the respective force coils to maintain the weighing pan in position.

18 Claims, 5 Drawing Sheets

BALANCE WITH FREE-FLOATING WEIGHING PAN

CROSS-REFERENCE TO RELATED APPLICATIONS

This application is filed as a bypass continuation of, and claims the benefit of a right of priority to, PCT/EP2015/068993, filed on 19 Aug. 2015, which makes a claim of priority to European patent application EP 14183599.1, filed on 4 Sep. 2014. The content of each application is incorporated by reference as if fully recited herein.

TECHNICAL FIELD

The invention concerns a balance with a free-floating weighing pan.

BACKGROUND

To weigh masses with high accuracy, the state-of-the-art solution is to use balances that are based on the principle of magnetic force compensation. In balances of this kind, the force acting on the weighing pan is transmitted by guide members and through flexure pivots to a lever system. The last lever of the lever system is held in a constant position by means of a force coil immersed in a permanent magnet. The required amount of current flowing through the force coil is measured and used to determine the weighing result.

Conventional magnetic force compensation balances isolate all moments acting on the weighing pan, so that only the force in the direction of gravity is being measured. This concept has the disadvantage that additional forces could arise in the direction of gravity and falsify the weighing signal. Consequently, the balance should be set up in such a way that the line of action of the weighing cell, i.e. the axis along which the force under measurement is to be applied and along which the weighing cell has its highest sensitivity is aligned as closely as possible to the direction of gravity. This is accomplished by adjusting the leveled position of the balance.

In addition, further errors can occur if the center of gravity of the weighing object is not located on the line of action of the weighing cell. The associated eccentric loading force is not transmitted to the weighing cell and cannot be taken into consideration for the measurement. Eccentric loading forces can only be estimated and corrected with additional sensors.

It is further disadvantageous that forces can occur in the various pivot points and flexure joints, whereby the accuracy of the balance can be compromised. Furthermore, levers and flexure pivots are particularly sensitive to heat and therefore often become sources of errors for the weighing result.

Among the prior art, a balance with an electromagnetic force compensation system is disclosed in U.S. Pat. No. 5,485,784 wherein the weight force is transmitted directly from the weighing pan to the magnetic force compensation system without mechanical contact. Thus, there is no loss of force of the kind occurring in the pivot points and transmission levers of traditional magnetic force compensation balances. The gravity force is compensated by a system with two force coils. In addition, passive magnets are arranged vertically, serving to stabilize the force compensation system in the direction of gravity. Thus, the passive magnets ensure the correct leveled position of the balance. In addition, the passive magnets compensate for the moments that are caused by the eccentrically placed load. In this set-up, the compensation depends only on the magnet force and on the arrangement of the passive magnets relative to each other. It is not matched to the eccentric loading force. The extent to which the eccentric loading force affects the weighing result can therefore not be estimated. Consequently, this system is too inaccurate for balances of the highest resolution of the weighing result.

Disclosed in JP2005127858A is a weighing device with at least six magnet units and guide elements holding a load chamber in a floating position free of contact. Each of the magnet units includes two coils, two electromagnets and a permanent magnet. Arranged opposite each magnet unit is a guide element of ferromagnetic material which is fastened to the load chamber. The magnet units are arranged relative to the guide elements in such a way as to prevent any translatory or rotary movement of the load chamber. The distance between each guide element and the corresponding magnet unit is measured with one position sensor per magnet unit.

After the weighing object has been placed in the load chamber, the current is regulated in order to stabilize the distance between magnet units and guide elements. When the position is stabilized, the current is regulated gradually towards zero. The attractive forces of the magnet units change accordingly, and as a consequence the distance between the magnet units and the guide elements, and thus the position of the load chamber, is changed. When the current has reached zero, the distances between the magnet units and the respective guide elements are measured. The weight of the weighing object is calculated from the distances between the magnet units and the respective guide elements and from the permeability of the magnet. A Hall element is used to optimize the regulation of the current and thus of the distance between the magnet units and guide elements.

The weighing device disclosed in JP2005127858A has the advantage that the current in the coils is set to zero. Thus, no additional heat is generated in the coils. The influence on the properties of the magnets is therefore limited.

However, the determination of the weight based on the distance has considerable disadvantages. The nonlinearity of the functional relationship between magnetic field and distance makes it on the one hand more difficult to regulate the distance and on the other hand leads to an inaccuracy in the determination of the weight.

It is a further drawback of this balance to have an enclosed load chamber which is carried by magnets on all sides. The enclosed load chamber is heavier than a weighing pan. Due to its so-called dead load, the load chamber limits the maximum volume of the weighing object. Furthermore, the magnets are attached to the load chamber. Consequently, the weight to be carried besides the weighing object is heavier, and the accuracy of the balance is reduced.

The load chamber has the further disadvantage that a balance of this kind is very voluminous, independent of the volume of the load, and is therefore strongly influenced by air buoyancy. In addition, due to the large volume this solution is not suitable for analytical balances.

It is therefore the object of the invention to provide a weighing method and a weighing device for carrying out the method wherein no internal reactive forces are present, which allows the weight to be measured with the highest possible accuracy, independent of the volume of the weighing object, and wherein the weighing device is as insensitive to vibrations as possible. A weighing method is intended to measure, and to compensate for, the position of the center of gravity of the weighing object relative to the weighing pan as well as the out-of-level condition of the weighing device.

SUMMARY

This task is solved by a method of operating a balance with a weighing pan, at least six position sensors, and a weighing mechanism, wherein the weighing mechanism contains at least six electromagnetic mechanisms, each of which includes a permanent magnet and a force coil. During the weighing process, the electromagnetic mechanisms generate compensation forces acting on the weighing pan in the six degrees of freedom by sending currents through the force coils depending on their respective positions and orientations relative to the weighing pan. The claimed method consists of the following steps:

measuring the position of the weighing pan in all three dimensions by means of the at least six position sensors;

simultaneously regulating the respective currents flowing in the force coils, so that the compensation forces, through the sum of their respective moments, will hold the weighing pan in a predetermined free-floating and constant position relative to translatory and rotary displacements in the six degrees of freedom; and calculating the weighing result from the amounts of current flowing in the respective force coils.

The position sensors and the weighing mechanism are arranged in a balance housing. The position sensors serve to control the current flowing through the force coils. The coil flowing in the force coils is regulated in such a way that the position of the weighing pan is held constant at a predetermined value. The amount of current required is proportional to the force induced by it. The position sensors preferably include optoelectronic sensors. The currents flowing in the force coils are controlled in such a way that the force coils, and thus the weighing pan, are essentially not moving relative to the respective permanent magnets during the weighing process.

Since the gravity force is compensated only by the electromagnetic mechanisms and since the at least six electromagnetic mechanisms are acting in the six degrees of freedom, the force acting on the weighing pan can be completely controlled, measured and compensated.

The terminology "six degrees of freedom" in the present context means the three degrees of freedom of translatory movement relative to a Cartesian coordinate system and the three degrees of freedom of rotation about the axes of the Cartesian coordinate system.

The force coils are preferably arranged in the linear range of the respective permanent magnets. This is the area where the magnetic field of the permanent magnet has the greatest influence on the force coil. Consequently, the forces induced by the force coils (compensation forces) can be determined and controlled with the highest accuracy. The electromagnetic mechanisms benefit from the advantage of a very small hysteresis which is characteristic of the kinds of permanent magnets available today.

The Lorentz force induced by the at least six force coils is regulated by means of the respective currents flowing through them. Based on the absolute values of the compensation forces as well as the positions and the vector orientations of the individual force coils relative to each other, the sum of the moments acting on the center of gravity of the balance can be calculated. From this, the resultant force can be calculated in three dimensions.

In an advantageous realization of the method, the weighing pan is coupled to a single coupling element that is preferably made of one piece of material. The coupling element and the weighing pan are rigidly connected to each other. During the weighing process, the electromagnetic mechanisms generate compensation forces acting on the weighing pan through the coupling element in the six degrees of freedom by sending currents through the force coils depending on their respective positions and orientations relative to the coupling element. In this implementation of the method, the electromagnetic mechanisms exert compensation forces directly on the coupling element.

This embodiment has the advantage that, depending on the form of the coupling element, the weighing pan can be arranged above, to the side of, or below the balance housing.

In another advantageous embodiment of the method where the weighing pan is coupled to the six electromagnetic mechanisms by way of a coupling element, the position of the coupling element is measured by the position sensors. Since the relative position of the weighing pan in relation to the coupling element is constant and known, the position of the weighing pan can be derived from the measurements. This method is advantageous if the weighing pan is arranged outside of the balance housing, for example to the side of the balance.

In another embodiment where the force coils are held in floating position by the compensation forces, the position of the weighing pan can be measured by way of the positions of the at least six force coils. Based on the positions of the force coils and the position of the weighing pan in relation to the positions of the force coils, the position of the weighing pan can be determined.

In an advantageous embodiment of the method, the information about the currents flowing in the force coils is processed for the purpose of calculating the eccentricity of the load. If the weighing object is placed eccentrically relative to the weighing mechanism, this has an effect on the distribution of the forces exerted on the electromagnetic mechanisms by the weighing object. Thus, the center of gravity of the force exerted on the weighing pan and the lines of action of the individual compensation forces relative to the vertical can be calculated.

In a further embodiment of the method, the information about the currents flowing in the force coils is processed for the purpose of calculating the inclined position of the weighing pan. The individual compensation forces are directly affected by the inclination of the balance. Based on the sum of the resultant moments, the inclination of the balance can be calculated. Consequently, the leveled position of the free-floating weighing pan needs to be only coarsely adjusted before operation, and the weighing result will not be affected by the inclination of the balance.

Preferably, each of the at least six position sensors measures the position of another predefined point of the weighing pan. In an advantageous embodiment, three position sensors are oriented along the Z-axis in the direction of gravity, two are oriented along the Y-axis which is orthogonal to the Z-axis, and one is oriented along the X-axis which is orthogonal to both.

A balance with the capability to perform the foregoing method is claimed. The balance includes a weighing pan and at least six position sensors, wherein the at least six position sensors are provided for the measurement of the position of the weighing pan in all three dimensions. The balance further includes a weighing mechanism with at least six electromagnetic mechanisms, wherein each of the electromagnetic mechanisms includes a force coil and a permanent magnet, and wherein the weighing mechanism is designed to generate compensation forces ($F_{c1}$-$F_{c6}$) acting on the weighing pan in the six degrees of freedom by sending currents through the force coils depending on their respective orientations and positions relative to the weighing pan. In addition, the balance includes a power supply to individually deliver current to the six force coils. The force coils are regulated individually by a regulating unit. The regulating unit receives the signals of the position sensors as inputs and accordingly regulates the individual currents flowing in the force coils until the weighing pan is held by the compensation forces ($F_{c1}$-$F_{c6}$) in a constant, predefined and free-floating position relative to the six translatory and rotatory degrees of freedom. The balance further includes an arithmetic unit provided for the calculation of the weighing result based on the amounts of current flowing in the respective coils.

It is a particularly advantageous aspect of the balance with a free-floating weighing pan as claimed herein that there are no pivot points between the at least six electromagnetic mechanisms and the weighing pan. Consequently, the amount of force lost between the force generated by the electromagnetic mechanisms and the force exerted on the weighing pan is practically set to zero. Accordingly, the balance with free-floating weighing pan is suitable for weight measurements of high resolution.

With the absence of a hanger, guide members, flexure pivots and levers, the volume of the balance is fundamentally reduced. The result is a comparatively smaller balance with a lower height, thus leaving more space on the laboratory counter.

The weighing pan can be arranged directly above the weighing mechanism. In this case it is advantageous to fasten the force coils directly to the weighing pan. Since conventional force coils are lighter than permanent magnets, the weight to be supported is smaller than with the reverse arrangement.

In this embodiment, the uniform distribution of the force acting on the weighing pan results in a larger measurement range than is possible with a conventional direct-measuring system with a single force coil.

The electromagnetic mechanisms can also be coupled to the weighing pan by way of a coupling element. This makes it possible to build a balance in which the weighing pan is not necessarily arranged above the weighing mechanism.

For example, the weighing pan can be arranged to the side of the balance. This is particularly advantageous if the balance is used in the laboratory, as the weighing pan can be arranged closer to the work surface. This reduces the sensitivity to air currents and simplifies the placing of the weighing object on the weighing pan.

In another embodiment, three of the electromagnetic mechanisms are arranged essentially along each of two lines that extend near each other. This has the advantage that the size of the balance in one dimension can be significantly reduced. This long and narrow configuration can be used in arrays of multiple weighing cells.

A balance according to a further embodiment has a weighing pan that is arranged between two groups of electromagnetic mechanisms. The use of the balance is particularly advantageous in conjunction with a conveyor belt. Since the electromagnetic mechanisms are not located directly below the weighing pan, they can be installed on a rigid body that is not susceptible to vibrations. In addition, the arrangement of the electromagnetic mechanisms in two groups allows a better distribution of the weight over all of the electromagnetic mechanisms. The two groups of electromagnetic mechanisms arranged opposite each other allow the conveyor belt to be positioned between them.

The weighing pan can also be coupled to the weighing mechanism in a hanging position.

In an advantageous embodiment, the electromagnetic mechanisms are arranged in such a way that the electromagnetic mechanisms act on the weighing essentially like a hexapod. A hexapod has six drive units supporting a platform relative to six axes in three directions of linear displacement and three directions of rotation.

This embodiment has the advantage that the six electromagnetic mechanisms are carrying equal parts of the load. Accordingly, the force coils have a greater capacity. This configuration is particularly advantageous for the weighing of filters or other voluminous weighing objects.

In a further embodiment, the electromagnetic mechanisms are arranged so that the first, the second and the third electromagnetic mechanism exert forces which in essence oppose the force of gravity and thus hold the weighing pan in a free-floating position. The fourth, the fifth and the sixth electromagnetic mechanism are arranged so that the weighing pan is stabilized within the horizontal plane.

In another embodiment of the balance, the electromagnetic mechanisms are arranged so that they act on the weighing pan through a vertical coupling element of the latter, that the first electromagnetic mechanism exerts a force on the coupling element essentially in the opposite direction of gravity, that the second and the third electromagnetic mechanism stabilize a first point of the coupling element in a first horizontal plane, that the fourth and the fifth electromagnetic mechanism are acting on a second point of the coupling element in a second horizontal plane, and that the sixth electromagnetic mechanism is arranged so as to prevent a rotation of the weighing pan in its horizontal plane.

BRIEF DESCRIPTION OF THE DRAWINGS

Different embodiments of the balance with a free-floating weighing pan will be described in more detail in the following and are schematically illustrated in the drawings, wherein.

DETAILED DESCRIPTION

Figure 1:
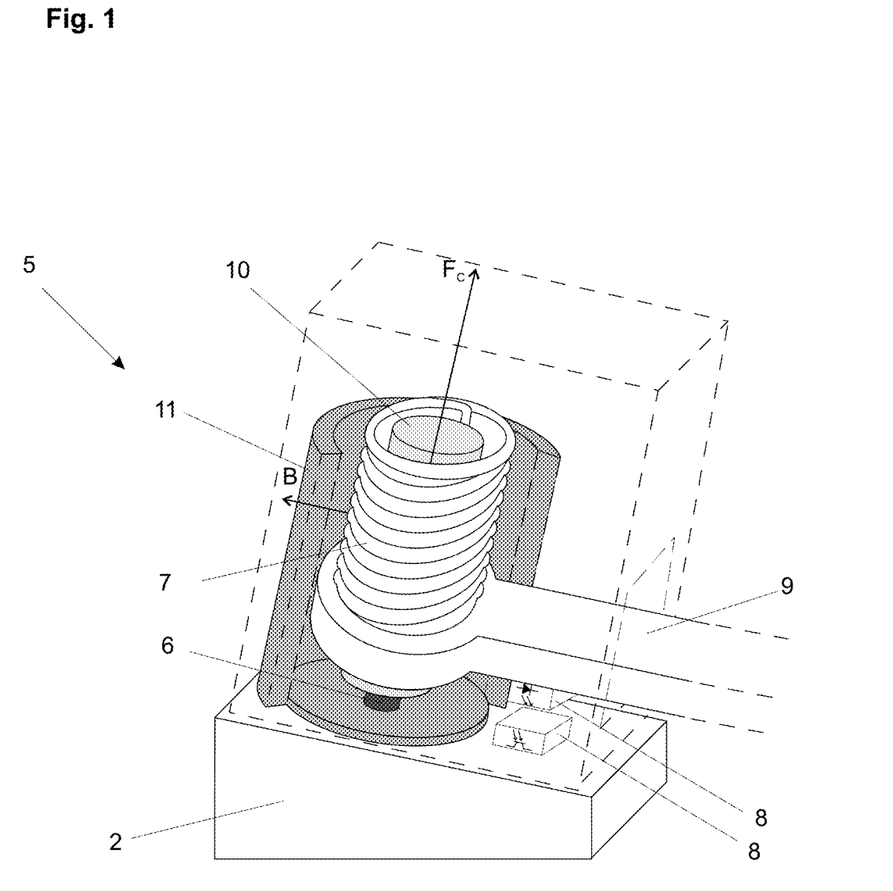
FIG. 1 is shows an electromagnetic mechanism in a schematic representation.

FIG. 1 shows an electromagnetic mechanism 5. The electromagnetic mechanism 5 includes a force coil 7 and a permanent magnet 6. The force coil 7 is mechanically connected to a coupling element 9. The permanent magnet 6 is supported by the balance housing 2. It is connected to a cylindrical barrel 11 and a pole piece 10. The pole piece 10 and the cylindrical barrel 11 serve to conduct the magnetic field. The arrangement of the force coil 7 relative to the permanent magnet 6 is such that the force coil 7 is movable in the direction of the force vector $F_c$. The electromagnetic mechanism 5 is not oriented vertically. Consequently, the force vector $F_c$ has a vertical and a horizontal component relative to the direction of gravity.

The force coil 7 is connected to a variable power supply. In accordance with the Lorentz force principle, a current flowing through the force coil 7 that is immersed in the magnetic field of the permanent magnet 6 generates a force. The polarity and the amplitude of the current are regulated in such a way that the force coil 7 holds the coupling element 9 free-floating and without physical contact in a predefined constant position above the balance housing 2.

The coupling element 9 can be fastened to the force coil 7 or to the permanent magnet 8. The coupling element 9 is preferably supported by the force coil 7. Thus, fewer fastening means are needed between the force coil 7 and the coupling element 9, whereby the dead load of the weighing pan 3 is reduced.

Alternatively, it would also be possible to connect the permanent magnet 6 to the coupling element 9 and the force coil 7 to the balance housing 2. However, to use the least amount of current, it is of advantage for the electromagnetic mechanism 5, if the lighter of the two elements force coil 7 and permanent magnet 6 is attached to the moving part, i.e. to the coupling element 9.

Figure 2:
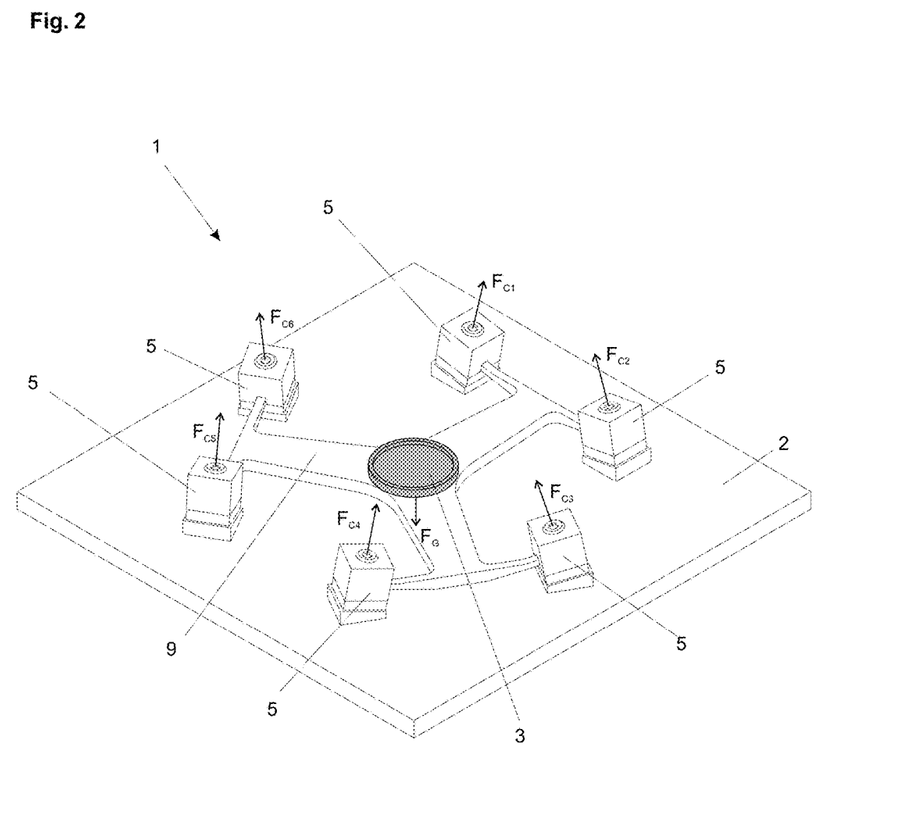
FIG. 2 illustrates a first embodiment of a balance with a free-floating weighing pan located amid the arrangement of electromagnetic mechanisms.

FIG. 2 shows a balance 1 with six electromagnetic mechanisms 5 and a free-floating weighing pan 3. The electromagnetic mechanisms 5 are attached to a base plate of the balance housing 2. The establish the connection between the coupling element 9 and the balance housing 2 by means of the forces $F_{c1}$-$F_{c6}$ generated by the electromagnetic mechanisms. The weighing pan 3 is mechanically connected to the coupling element 9. The coupling element 9 has several arms through which the weighing pan 3 is coupled to the electromagnetic mechanisms. The configuration of the coupling element 9 with a plurality of arms has the advantage of being lightweight. The weighing pan 3 is arranged essentially in the middle of the electromagnetic mechanisms 5. This results in an approximately uniform distribution of the weight force of the weighing object on the six electromagnetic mechanisms 5. This increases the weight capacity. The balance 1 can have more than six electromagnetic mechanisms 5.

The six electromagnetic mechanisms 5 are not directed vertically. They are oriented, respectively, to exert forces relative to all six translatory and rotatory degrees of freedom. Each of them is regulated by a current, so that they compensate the weight forces of the weighing pan 3, the coupling element 9 and the weighing object and hold the coupling element 9 in a constant, predetermined and free-floating position. With the theory of the Lorentz force, the force $F_c$ generated by the force coil 7 can be calculated from the current that is required. Based on the positions and orientations of the electromagnetic mechanisms 5 relative to each other, the moments acting on the weighing pan 3 in the three dimensions are calculated. From the sum of all moments, the resultant compensation force can be calculated. The mass of the weighing object can be determined from the vertical component of the resultant compensation force.

The at least six position sensors 8, which are not shown in FIGS. 2 to 7, can be directly or indirectly attached to the balance housing 2. They can measure the position of the weighing pan 3 either directly by way of six predefined points of the weighing pan 3 or by way of six predefined points of the coupling element 9. As an alternative, the positions of the free-floating parts of the electromagnetic mechanisms 5 (force coils or permanent magnets) can be measured. The position sensors 8 are arranged so that they can register the position of the weighing pan 3 in the three dimensions.

Figure 3:
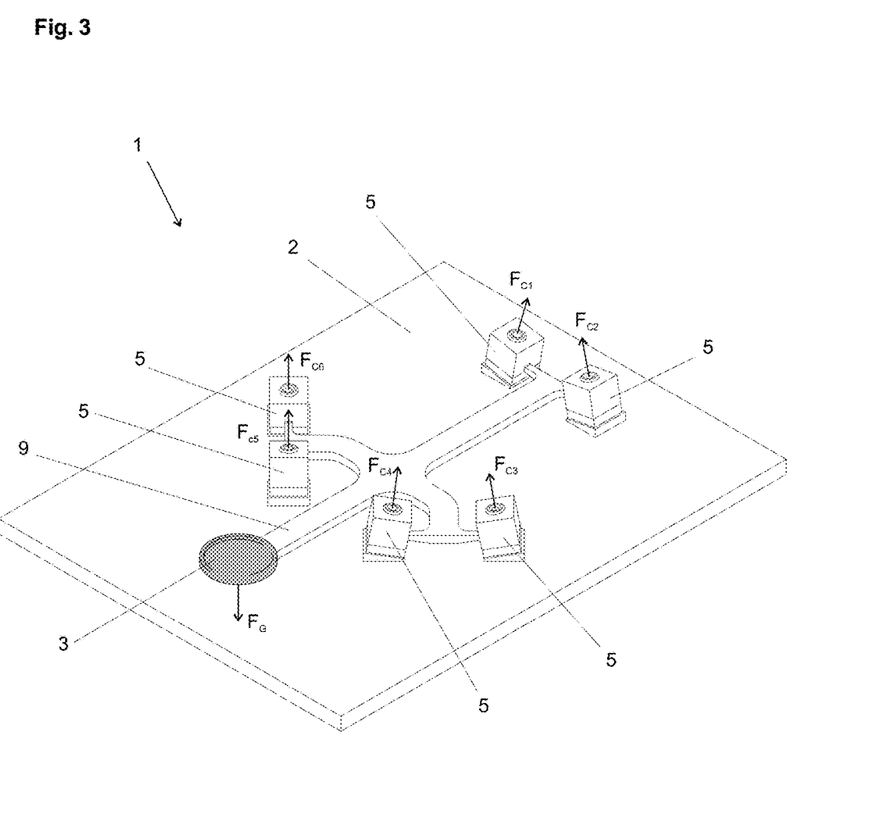
FIG. 3 illustrates a second embodiment of a balance with a free-floating weighing pan located laterally of the arrangement of electromagnetic mechanisms.

FIG. 3 illustrates a balance 1 in a further embodiment with six electromagnetic mechanisms 5 and a free-floating weighing pan 3. The electromagnetic mechanisms 5 are attached to the balance housing 2. They establish a connection between the coupling element 9 and the balance housing 2. The coupling element 9 has several arms. A longer arm is connected to the weighing pan 3, so that weighing pan 3 is not positioned above the weighing mechanism 4 but laterally offset from the latter.

Four of the six electromagnetic mechanisms 5 are arranged closer to the weighing pan 3 than the other two. This configuration allows an essentially uniform distribution of the weight force of the weighing object, the weighing pan 3 and the coupling element 9 over the six electromagnetic mechanisms 5.

The six electromagnetic mechanisms 5 are not oriented vertically. Their respective orientations are such that they exert a force relative to each of the six translatory and rotatory degrees of freedom.

FIGS. 4 to 7 show different configurations of the system of electromagnetic mechanisms 5. Each configuration is particularly suitable for a specific application of the balance.

Figure 4:
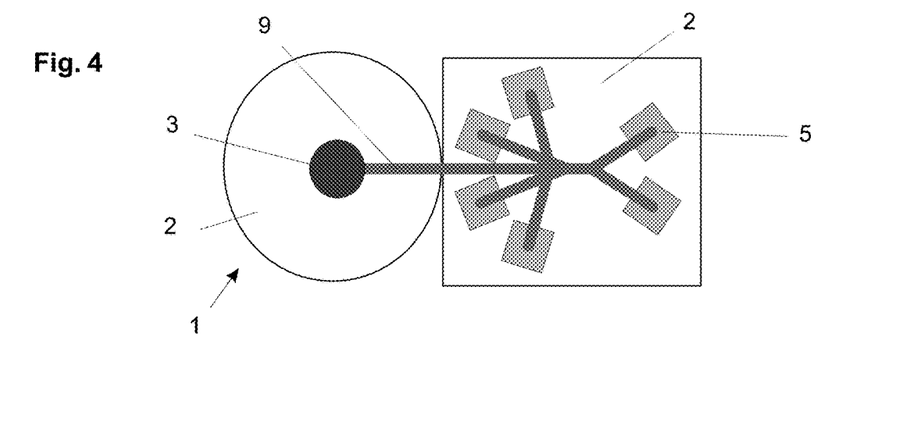
FIG. 4 illustrates a third embodiment of a balance with a free-floating weighing pan located laterally of the arrangement of electromagnetic mechanisms.

In a plan view, FIG. 4 schematically illustrates a balance 1 with a free-floating weighing pan 3 that is laterally offset to the side of the balance housing 2. The weighing pan 3 is coupled to the electromagnetic mechanisms 5 by way of a coupling element 9. Four electromagnetic mechanisms 5 are arranged closer to the weighing pan 3 than the two others, i.e. the electromagnetic mechanisms 5 are arranged so that the force is optimally distributed between the six force coils 7.

This configuration has the advantage that the weighing pan 3 is placed very close to the work surface. This facilitates the loading of the weighing object on the weighing pan 3 and the cleaning of the weighing pan 3. In addition, the weighing pan 3 in this configuration is less exposed to air currents.

Figure 5:
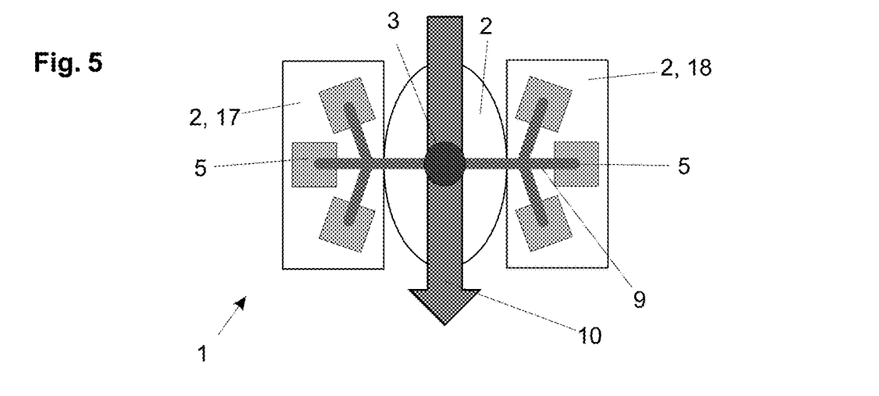
FIG. 5 illustrates a fourth embodiment of a balance with a balance housing configured in two parts and with a free-floating weighing pan arranged between the two parts.

FIG. 5 shows a balance 1 with six electromagnetic mechanisms 5 and with a first balance housing 17 and a second balance housing 18. Three electromagnetic mechanisms 5 are arranged to one side of the weighing pan 3 on the base plate of the first balance housing 17, while three other electromagnetic mechanisms 5 are arranged to the other side of the weighing pan 3 on the base plate of the second balance housing 18. The coupling element 9 with a plurality of arms connects all six of the electromagnetic mechanisms 5 to each other while contributing only a minimal amount of weight.

This configuration is particularly advantageous if the balance 1 is used in conjunction with a conveyor belt 10. The balance 1 is arranged in such a way that the conveyor belt 10 is not positioned above the balance housings 17, 18. The balance housings 17, 18 can thus be set on a solid base, so as not to be affected by the vibrations of the conveyor belt.

The weight force is uniformly distributed on the six electromagnetic mechanisms 5 around the weighing pan. Consequently their usable capacity is maximized.

Figure 6:
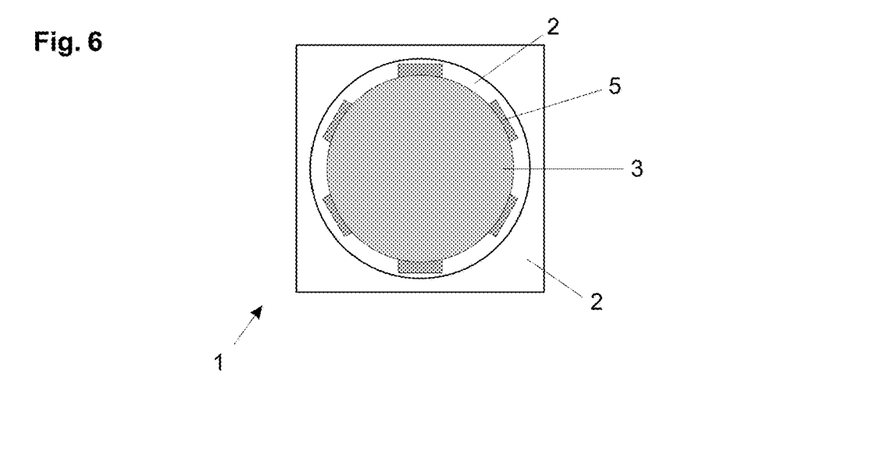
FIG. 6 represents a configuration for a precision balance.

FIG. 6 shows a balance 1 with a weighing pan 3 arranged in a free-floating state above the weighing mechanism 4. The electromagnetic mechanisms 5 are arranged in a circle at essentially regular intervals. The weighing pan 3 is centered above the circle of electromagnetic mechanisms 5. The latter are arranged in such a way that they act essentially like a hexapod on the weighing pan 3.

In this embodiment, the force coils 7 or the permanent magnets 6 can be fastened directly to the weighing pan 3. A coupling element 9 is not needed. The accuracy and the weighing capacity of the balance 1 are thereby increased, and the construction of the balance 1 is simplified.

Figure 7:
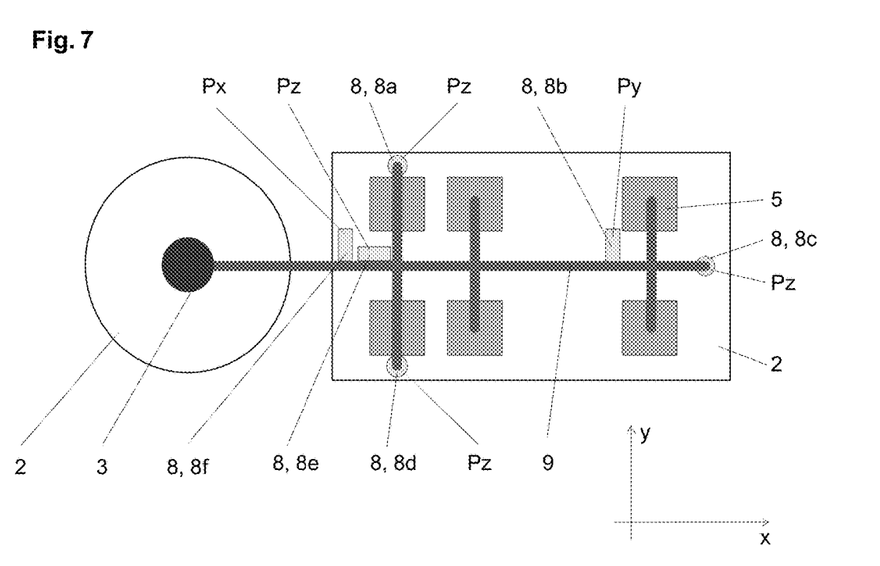
FIG. 7 illustrates a narrow-width configuration of the balance with free-floating weighing pan, with the position sensors shown in the drawing.

FIG. 7 illustrates an embodiment of the balance with the position sensors shown, wherein the weighing pan 3 is held in a free-floating state in a lateral position relative to the balance housing 2, with a transverse arrangement of the coupling element 9 and the electromagnetic mechanisms located along two lines directly left and right of the coupling element 9, so that the weight is distributed over the six electromagnetic mechanisms 5 as uniformly as possible.

This configuration is distinguished by a narrow width of the balance housing 2. Balances of this kind with a narrow housing are well suited for side-by-side arrangements of many balances, which are used for the calibration of pipettes and in other areas where a plurality of weights are measured simultaneously.

Six position sensors are arranged to measure the position of the coupling element 9 in the three dimensions. The position of the balance pan 3 can be derived from the relationship between the position of the weighing pan 3 and the position of the coupling element 9.

The position sensors 8 are mounted on the base plate of the balance housing 2, each of them measuring the respective distance to the coupling element 9. The position sensors 8a, 8c and 8d are oriented so that each of them measures the respective distance to the coupling element 9 in the Z-direction. The position sensors 8b and 8e are arranged to measure the respective distances to the coupling element 9 in the Y-direction. The position sensor 8f measures the position relative to the coupling element 9 in the X-direction.

Arrangements with more than six position sensors 8 are also possible. However, the minimum number is six, and they should be arranged in such a way relative to the coupling element, or relative to the weighing pan 3, that the position of the coupling element 9, and thus also of the weighing pan 3, can be measured in the three spatial dimensions.

The position sensors preferably include optoelectronic components. However, in principle any kind of position sensor could be used.

The foregoing description and the drawings show examples in which the electromagnetic mechanisms are essentially identical and arranged in a plane, with a coupling element of a predominantly flat configuration. It is considered self-evident that the scope of the invention also includes arrangements wherein the electromagnetic mechanisms are not necessarily identical and/or are arranged in different planes, or wherein the coupling element can have a curved configuration.

What is claimed is:

1. A balance, comprising:
   a weighing pan;
   at least six position sensors, arranged to measure the position of the weighing pan in all three dimensions;
   a weighing mechanism with at least six electromagnetic mechanisms, each of which includes at least one permanent magnet and at least one force coil, such that the weighing mechanism generates compensation forces to act, through currents sent to each force coil, in each of the six translatory and rotatory degrees of freedom on the weighing pan, based upon the orientation and position of each force coil relative to the weighing pan;
   a regulating unit to regulate the individual currents flowing in the force coils, wherein the compensation forces, through the sum of their respective moments, hold the weighing pan in a constant, predefined and free-floating position relative to the six degrees of freedom; and
   an arithmetic unit provided with software to calculate the weighing result based on the amounts of current flowing in the respective force coils.

2. The balance of claim 1, wherein the at least six electromagnetic mechanisms are arranged relative to each other in a manner that distributes the weight of the weighing pan essentially uniformly over the at least six electromagnetic mechanisms.

3. The balance of claim 2, wherein the weighing pan is arranged above the weighing mechanism.

4. The balance of claim 2, wherein the weighing pan is arranged below the weighing mechanism.

5. The balance of claim 2, wherein the weighing pan is arranged to the side of the weighing mechanism.

6. The balance of claim 1, wherein the electromagnetic mechanisms are arranged essentially in two groups of three that are placed, respectively, along a pair of lines which are in particular parallel and close to each other.

7. The balance of claim 1, wherein at least three of the electromagnetic mechanisms are arranged on a first side of the weighing pan and at least the further three electromagnetic mechanisms are arranged on a second side of the weighing pan, opposite to the first side.

8. The balance of claim 1, wherein the electromagnetic mechanisms are arranged on the weighing mechanism such that the electromagnetic mechanisms act on the weighing pan in the manner of a hexapod.

9. The balance of claim 2, further comprising a coupling element that couples the at least six electromechanical mechanisms with the weighing pan.

10. The balance of claim 9, wherein the coupling element comprises a carrier made of one piece of material and having a plurality of arms, the carrier connecting each of the electromagnetic mechanisms to the weighing pan.

11. The balance of claim 1, wherein the electromagnetic mechanisms are essentially identical and essentially arranged in a plane.

12. A method for operating a balance, wherein the method comprises the steps of:
    measuring the position of a weighing pan of the balance in all three dimensions by means of the at least six position sensors;
    generating, during the weighing process, a compensation force in each of at least six electromagnetic mechanisms associated with the weighing pan to act on the weighing pan in the six translatory and rotatory degrees of freedom of the weighing pan, each of the electromagnetic mechanisms including at least one permanent magnet and at least one force coil, wherein the compensation force is generated by a current sent through each force coil, depending on the respective position and orientation of the force coil relative to the weighing pan;
    simultaneously regulating the respective current flowing in each force coil, so that the compensation forces, through the sum of their respective moments, hold the weighing pan in a predetermined, free-floating and constant position relative to the six degrees of freedom; and calculating a weighing result from the amounts of current flowing in the respective force coils.

13. The method of claim 12, wherein the compensation forces generated act on the weighing pan through a coupling element that is connected to the weighing pan.

14. The method of claim 13, wherein the position of the weighing pan is measured by measuring the positions of the force coils and wherein the position of the weighing pan relative to the position sensors is derived from the measurement and from the known position of the weighing pan relative to the positions of the force coils.

15. The method of claim 13, wherein the position of the weighing pan is measured by measuring the position of the coupling element and wherein the position of the weighing pan relative to the position sensors is derived from the measurement and from the known position of the weighing pan relative to the coupling element.

16. The method of claim 12, wherein the respective amounts of current flowing in the force coils are used to calculate the inclination of the weighing pan.

17. The method of claim 12, wherein the respective amounts of current flowing in the force coils are used to calculate the location of the center of gravity of a weighing object lying on the weighing pan.

18. The method of claim 12, wherein the positions of three predefined points of the weighing pan are measured along the Z-axis, the positions of two predefined points of the weighing pan are measured along the Y-axis, and the position of one predefined point of the weighing pan is measured along the X-axis.

* * * * *